C. W. GRAHAM.
SOLDERING MACHINE.
APPLICATION FILED DEC. 26, 1911.
1,152,409.
Patented Sept. 7, 1915.
2 SHEETS—SHEET 1.
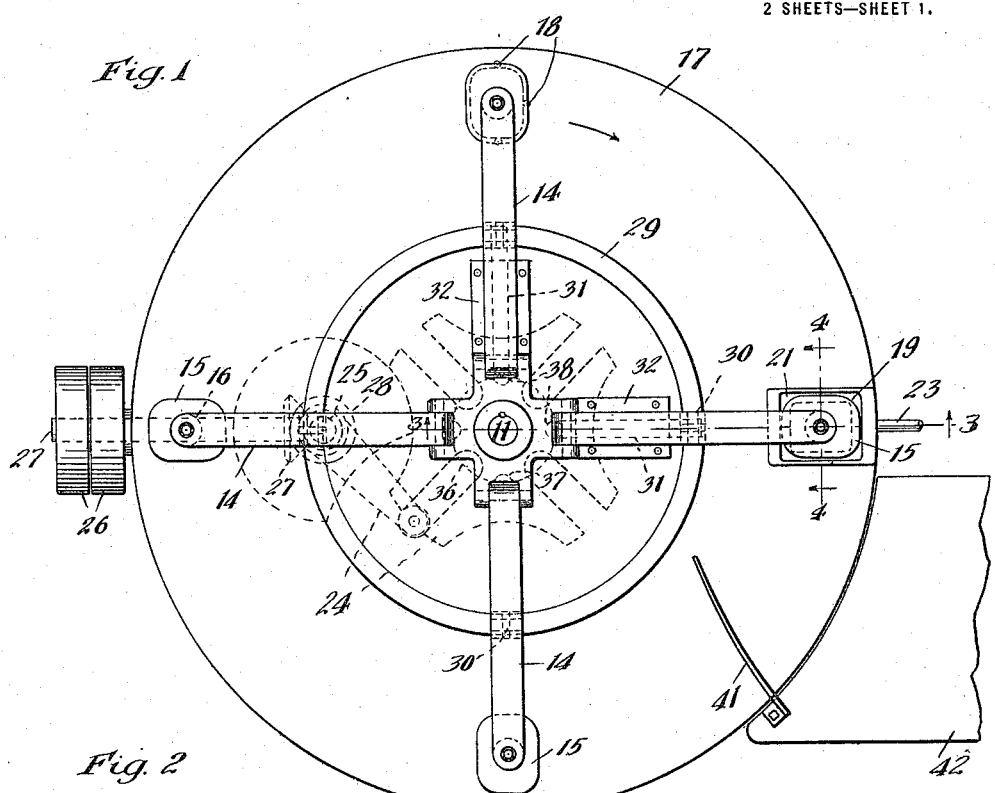
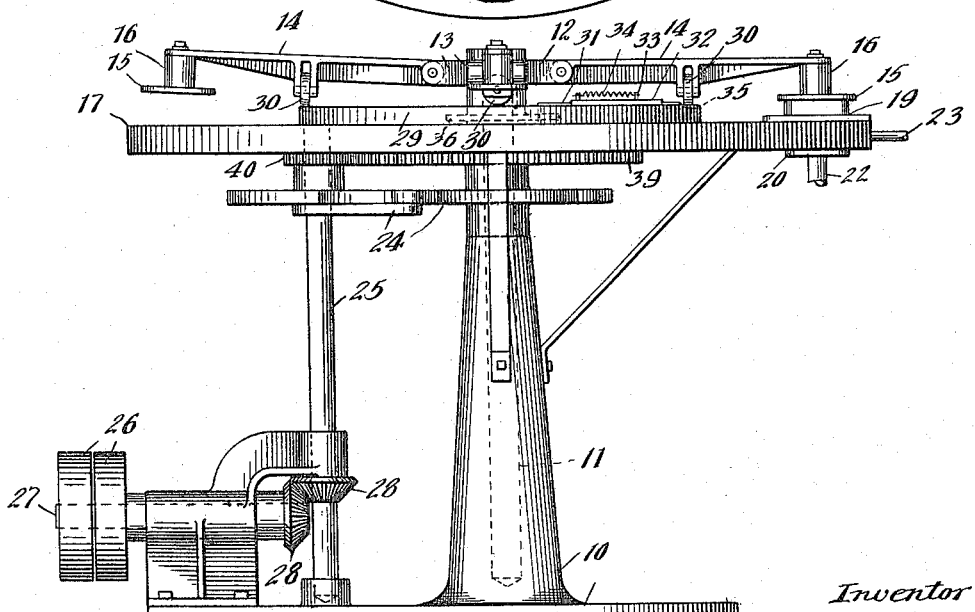
Witnesses:
Wm. Geiger
H. W. Munday
Inventor:
Charles W. Graham
By Munday, Evarts, Adcock & Clark
Attys.

C. W. GRAHAM.
SOLDERING MACHINE.
APPLICATION FILED DEC. 26, 1911.
1,152,409.
Patented Sept. 7, 1915.
2 SHEETS—SHEET 2.
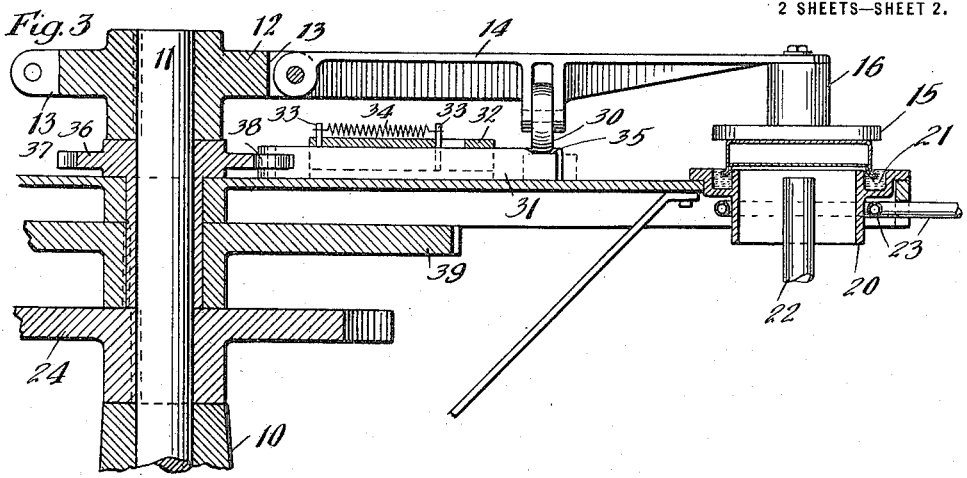
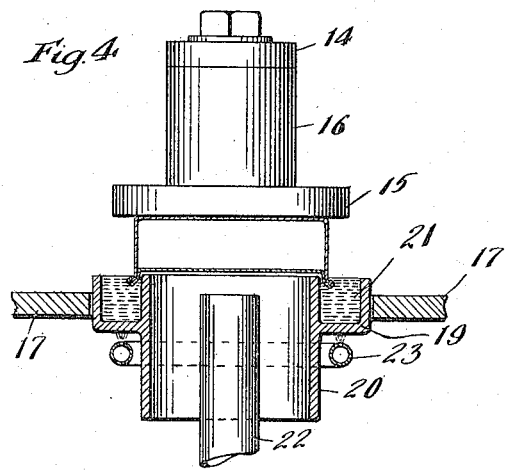
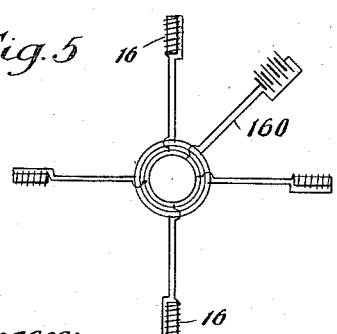
Witnesses:
Wm Geiger
H. W. Munday
Inventor:
Charles W. Graham
By Munday, Evarts, Adcock & Clarke.
Attys.

UNITED STATES PATENT OFFICE.

CHARLES W. GRAHAM, OF NEW YORK, N. Y., ASSIGNOR TO AMERICAN CAN COMPANY, OF NEW YORK, N. Y., A CORPORATION OF NEW JERSEY.

SOLDERING-MACHINE.

1,152,409.

Specification of Letters Patent.

Patented Sept. 7, 1915.

Application filed December 26, 1911. Serial No. 667,777.

*To all whom it may concern:*

Be it known that I, CHARLES W. GRAHAM, a citizen of the United States, residing in New York, in the county of New York and State of New York, have invented a new and useful Improvement in Soldering-Machines, of which the following is a specification.

This invention relates to soldering machines.

The object of the invention is to provide a machine which will solder covers to can bodies while the cans are in an inverted position, or that will solder the bottoms of can bodies while in an upright position, and is more particularly designed for use in connection with the soldering of filled rectangular cans, which have the covers mechanically attached to the body member before the solder is applied.

This invention is also particularly adapted to solder filled cans in which a part of the can contents acts as a flux for the solder between the flanges of the cover and the body. The machine operates automatically to pick up cans in an inverted position at one point and automatically dips the cans into a solder bath at another point, and the caps are then stripped from the carrier onto a receiving table or other suitable device.

In order to simplify the machine as much as possible, and to omit all unnecessary movable parts, especially as concerns the can body gripping members or chucks, although the latter may be employed without departing from the spirit of the invention, I prefer to use magnetic devices for holding the cans on the carrier in an inverted position.

More specifically, the invention consists in a rotatable carrier having a plurality of radially extending pivoted arms extending over a stationary table, a magnetized plate on the extremity of each of the pivoted arms, a solder bath disposed below the path of travel of the magnetized can holding plates, means for intermittently rotating the carrier and means for automatically lowering a pair of the pivoted arms while the carrier is at rest, whereby one of the chuck plates picks up a can in an inverted position and another arm is simultaneously lowered and the can held thereby is dipped into the solder bath.

The invention furthermore consists in the improvements in the parts and devices and in the combinations of parts and devices herein shown, described or claimed.

In the drawings forming a part of this specification, Figure 1 is a plan view of a machine embodying my improvements. Fig. 2 is a side elevation of the structure shown in Fig. 1. Fig. 3 is a partial, vertical section, upon an enlarged scale, taken on the line 3—3 of Fig. 1. Fig. 4 is a partial, vertical section, upon an enlarged scale, taken on the line 4—4 of Fig. 1 and Fig. 5 is a diagrammatic view illustrating the circuits for magnetizing the can holding plates.

In the drawing, 10 denotes any suitable base or framework having mounted therein a rotatable shaft 11, said shaft having keyed thereto a spider or carrier 12, said spider being provided with a plurality of radially extending members 13, each of said members having pivotally mounted therein a radially extending arm 14. Each of said arms is provided at its free end with a magnetized plate 15, which may be either permanently magnetized, or, as shown in the drawings, may be magnetized by means of electromagnets 16, energized from any suitable source of current 160.

The spider 12 with its radially extending arms 14 rotates above a stationary table 17, said table 17 being provided at one point with pins 18 adapted to center the can body to be soldered. At another point, the table is provided with a solder bath 19, said bath 19 comprising a member 20 provided with a channel portion 21 in which the molten solder is adapted to be retained, the channel 21 being of substantially the outline of the seam to be soldered, and said member 20 being provided with an interior cut out portion in which is located a pipe 22 by means of which a cooling blast of air may be projected against the surface of the can being soldered. Means for heating the solder may be provided in the form of a gas burner 23 extending around and beneath the channel portion 21. The carrier 12 is given an intermittent rotation by a Geneva gear 24, driven from a shaft 25 which receives its power from any suitable source through the pulleys 26, shaft 27 and bevel gears 28. Located on the upper portion of the table 17 is a circular cam track 29, on which are adapted to ride rollers 30, mounted in each of the arms 14. The cam track 29 is provided at points radially in line with the can centering pins 18 and the solder bath with reciprocating slides 31 of the same height as the track 29 mounted in guides 32, and adapted to be retracted inwardly as by means of pins 33 and springs 34. Each of the slides 31 is provided with a recessed portion 35, which is normally projected outwardly beyond the cam track 29, but which, when an arm 14 is positioned in line with either the can centering pins 18 or the bath, is adapted to be retracted, thereby allowing the roll 30 to fall. The downward movement of the roller 30 lowers the arm 14, and at the same time, the plate 15. This movement at the can centering means will pick up one can and at the solder bath will dip the can, held to the plate 15, in the solder bath 19. The slides 31 are controlled by means of a cam 36, rotatably mounted on the shaft 11, said cam 36 being provided with a plurality of notches 37, which are engaged by a roller 38 on the inner end of each of the slides 31. The cam 36 is continuously rotated as by means of a gear 39 meshing with a gear 40 on the rotatable shaft 25. After the cans have been soldered, they are then removed from the plates 15 by means of a stripping plate 41, which throws the cans out onto an adjacent table 42.

The machine, as shown, is particularly adapted to operate on rectangular cans in which the cover flange is bent around or tucked over the flange on the body portion, and in operation, a can having a cover secured thereto is positioned as by means of the centering pins 18 on the table 17 in an inverted position. The arm 14 of the carrier, during an interval of rest, is lowered, and the magnetized plate 15 will then engage the inverted can and lift the same, and on the next movement of the carrier will position the can over the solder bath 19. During the next period of rest, this arm will be lowered and the seam immersed in the bath 19, it being evident that the cam 36 is so timed relative to the movements of the carrier, that a notch 37 in said cam 36 will be positioned opposite the roller 38 on each slide 31 while the carrier is at rest. The machine is adapted to operate on filled sardine cans, in which the oil serves as a flux for the solder, and during the movement from the centering pins 18 to the solder bath, this oil will have time to creep or seep down between the flanges on the cover and body.

I have shown one form of my invention, but I wish it to be understood that the form shown is merely illustrative, and that many changes and variations may be made in various details of my mechanism without departing from the spirit of the invention, and all such changes and variations are contemplated as fairly come within the scope of the appended claims.

I claim:—

1. In a machine for soldering cans or other similar articles, the combination of a solder bath, a magnetized plate adapted to attract and hold a can body, with a cover secured thereto, in an inverted position, means for rotating the said plate in a substantially horizontal plane over the solder bath, and connected mechanism for automatically depressing the plate to dip the seam of the can body and cover into the solder bath during a period of intermission in the horizontal rotation of the plate.

2. In a machine for soldering cans or other similar articles, the combination of a stationary solder bath, an intermittently movable arm adapted to rotate in a substantially horizontal plane above the bath, a plate depending from the said arm and adapted to hold the can by the bottom surface of the plate, means for intermittently rotating the said arm and causing it to come to rest above the bath, and mechanism connected with said rotating means for automatically depressing the arm and plate to dip the seam of the can into the said bath, said mechanism being arranged to act during the intermission of the rotary movement of the said arm.

3. In a machine for soldering cans or other similar articles, the combination with a stationary solder bath, of an intermittently rotatable carrier having a plurality of radially projecting pivotally mounted arms thereon, each of said arms being provided at its free end with a magnetized plate adapted to hold a can body having a cover secured thereto in an inverted position over the solder bath, and means whereby the free end of each of the arms and the solder bath are caused to move vertically relatively to each other.

4. In a machine for soldering cans or other similar articles, the combination with a stationary table, of a solder bath, an intermittently rotatable carrier having a plurality of pivotally mounted radially extending arms thereon, each of said arms being provided at its free end with a magnetized plate, a cam track on said table, each of said arms having a roller adapted to travel on the cam track, said cam track being provided at a portion thereof with a reciprocating slide, means for intermittently rotating the carrier, and a continuously rotatable cam for reciprocating said slide.

5. In a device of the class described, in combination, a stationary table provided with centering devices at one portion thereof, and with a solder bath at another portion, an intermittently rotatable carrier having a plurality of radially extending pivotally mounted arms thereon, each of said arms having at its free end means adapted to hold a can body having a cover secured thereto in an inverted position, and means adapted to cause the free end of two of said arms to move relatively to the table and the solder bath during each period of rest of the rotatable carrier.

6. In a machine for soldering cans or other similar articles, the combination with a stationary solder bath, of an intermittently moving can holding device adapted to attract and hold against its bottom a can body and cover secured thereto in an inverted position over the bath, and automatically operated means for moving said can holding device toward and from the solder bath between the periods of intermittent movements, and mechanism connected with the said carrier for moving the same and for causing the actuation of said automatically operated means.

7. A machine of the character described comprising, in combination: an intermittently rotatable carrier having a pivotally mounted arm thereon, said arm having a magnetized plate on the end thereof adapted to hold a can or similar article; a stationary solder bath over which said plate is adapted to move; and means for operating said arm to move the plate thereon toward and from the solder bath, substantially as specified.

8. In a soldering machine the combination of a table adapted to support cans to be soldered, a solder bath arranged near the plane of said table, a carrier mounted to rotate above said table and bath, means for rotating the said carrier intermittently, a magnetized can-attracting and can-holding plate depending from said carrier and adapted to hold and carry a can on its bottom surface, automatic mechanism connected with the carrier-rotating means for depressing the plate when over the table to attract a can, and when over the said bath to dip the can flange, and a stripping device for engaging the side of a soldered can after it has left the bath and while it is near the table to arrest the can and allow the said plate to slide along the bottom of the arrested can and be detached from the same.

CHARLES W. GRAHAM.

Witnesses:
W. D. FOSTER,
WALTER HENRY.

Copies of this patent may be obtained for five cents each, by addressing the "Commissioner of Patents, Washington, D. C."